US012770465B2

(12) United States Patent
Petersen et al.

(10) Patent No.: US 12,770,465 B2
(45) Date of Patent: Oct. 20, 2026

(54) DYNAMICALLY TRACKING GAMING ESTABLISHMENT DEVICE TRANSACTIONS

(71) Applicant: IGT, Las Vegas, NV (US)

(72) Inventors: Erik Petersen, Sparks, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 225 days.

(21) Appl. No.: 18/589,051

(22) Filed: Feb. 27, 2024

(65) Prior Publication Data

US 2025/0273048 A1 Aug. 28, 2025

(51) Int. Cl.
*G07F 17/32* (2006.01)

(52) U.S. Cl.
CPC ...... *G07F 17/3255* (2013.01); *G07F 17/3234* (2013.01); *G07F 17/3239* (2013.01)

(58) Field of Classification Search
CPC ............. G07F 17/3255; G07F 17/3234; G07F 17/3239
See application file for complete search history.

(56) References Cited

U.S. PATENT DOCUMENTS

| | | | |
|---|---|---|---|
| 7,410,422 B2 | 8/2008 | Fine | |
| 7,419,427 B2 | 9/2008 | Boushy | |
| 7,815,506 B2 | 10/2010 | Franklin et al. | |
| 8,177,634 B2 | 5/2012 | Herrmann et al. | |
| 8,191,121 B2 | 5/2012 | Ruppert et al. | |
| 8,282,489 B2 | 10/2012 | Arezina et al. | |
| 8,506,395 B2 | 8/2013 | Bytnar et al. | |
| 8,529,338 B2 | 9/2013 | Allen et al. | |
| 8,571,905 B2 | 10/2013 | Risnoveanu et al. | |
| 8,734,230 B2 | 5/2014 | Yoseloff | |
| 8,747,228 B2 | 6/2014 | Beaudoin | |
| 8,956,221 B2 | 2/2015 | Allen et al. | |
| 8,979,646 B2 | 3/2015 | Moser et al. | |
| 9,159,191 B2 | 10/2015 | Pacey | |
| 9,196,122 B2 | 11/2015 | Allen et al. | |
| 9,317,858 B2 | 4/2016 | Preisach | |
| 9,607,473 B2 | 3/2017 | Arezina et al. | |
| 9,659,444 B2 | 5/2017 | Norris | |
| 9,865,128 B2 | 1/2018 | Lutnick | |
| 10,249,135 B2 | 4/2019 | Lutnick | |
| 10,497,204 B2 | 12/2019 | Weber et al. | |
| 10,540,847 B2 | 1/2020 | Moro | |
| 11,544,995 B2 | 1/2023 | Danielson | |
| 11,915,551 B2 | 2/2024 | Bryan | |
| 2003/0232647 A1 | 12/2003 | Moser | |
| 2004/0192432 A1 | 9/2004 | Walker et al. | |
| 2007/0117623 A1 | 5/2007 | Nelson et al. | |
| 2009/0124384 A1 * | 5/2009 | Smith | G07F 17/323 463/26 |
| 2009/0149244 A1 | 6/2009 | Lutnick | |
| 2009/0291746 A1 | 11/2009 | Walker et al. | |

(Continued)

OTHER PUBLICATIONS

"Reconsidering Whether the Wire Act Applied to Non-Sports Gambling," Opinion of the Office of Legal Counsel in vol. 42, dated Nov. 2, 2018, 23 pages.

*Primary Examiner* — Dmitriy Bolotin
(74) *Attorney, Agent, or Firm* — Neal, Gerber & Eisenberg LLP

(57) ABSTRACT

Systems and methods that enable the dynamic accumulation of values associated with various transactions occurring at a gaming establishment device.

20 Claims, 8 Drawing Sheets

(56) References Cited

U.S. PATENT DOCUMENTS

| | | | |
|---|---|---|---|
| 2010/0041470 A1 | 2/2010 | Preisach | |
| 2012/0028716 A1 | 2/2012 | Burke et al. | |
| 2012/0172136 A1 | 7/2012 | House et al. | |
| 2013/0244744 A1* | 9/2013 | Fonss | A63F 9/24 463/16 |
| 2014/0094274 A1* | 4/2014 | Guinn | G07F 17/3244 463/25 |
| 2015/0126271 A1 | 5/2015 | Xidos et al. | |
| 2015/0213674 A1 | 7/2015 | Little et al. | |
| 2016/0300442 A1 | 10/2016 | Preisach | |
| 2018/0040200 A1 | 2/2018 | Ellis | |
| 2018/0374304 A1 | 12/2018 | Sanford et al. | |
| 2019/0122481 A1 | 4/2019 | Risnoveanu et al. | |
| 2019/0311574 A1 | 10/2019 | Upton | |
| 2020/0273297 A1 | 8/2020 | Filipour | |
| 2020/0402356 A1 | 12/2020 | Upton | |
| 2021/0043031 A1* | 2/2021 | Keilwert | G07F 17/3239 |
| 2021/0264729 A1 | 8/2021 | Springer | |
| 2023/0096454 A1 | 3/2023 | Shepherd et al. | |
| 2024/0046757 A1 | 2/2024 | Nelson et al. | |
| 2025/0363867 A1* | 11/2025 | McIntosh | G07F 17/3267 |

* cited by examiner

1000

DYNAMICALLY TRACKING GAMING ESTABLISHMENT DEVICE TRANSACTIONS

CROSS-REFERENCE TO RELATED APPLICATION

This application is related to the following commonly owned co-pending patent application: U.S. application Ser. No. 18/589,057, entitled "CONVERTING GAMING ESTABLISHMENT PROMOTIONAL CURRENCIES VIA PROMOTIONAL CURRENCY COUNTER TRANSFERS."

BACKGROUND

In various embodiments, the systems and methods of the present disclosure enable the dynamic accumulation of values associated with various transactions occurring at a gaming establishment device.

Gaming machines may provide players awards in primary games. Gaming machines generally require the player to place a wager of credits to activate the primary game. The award of credits may be based on the player obtaining a winning symbol or symbol combination and on the amount of the wager.

BRIEF SUMMARY

In certain embodiments, the present disclosure relates to a system including a processor, and a memory device that stores a plurality of instructions. When executed by the processor responsive to an occurrence of a promotional currency counter creation event, the instructions cause the processor to determine a promotional currency counter parameter, and define a promotional currency counter associated with the determined promotional currency counter parameter. When executed by the processor responsive to an occurrence of a promotional currency counter modification event, the instructions cause the processor to modify an integer value of gaming establishment promotional currency tracked by the defined promotional currency counter.

In certain embodiments, the present disclosure relates to a gaming establishment patron management system including a processor, and a memory device that stores a plurality of instructions. When executed by the processor responsive to an occurrence of a promotional currency counter creation event associated with a first type of promotional currency, the instructions cause the processor to define, in run-time and without necessitating any update to a configuration of the gaming establishment patron management system, a first promotional currency counter operable to track the first type of promotional currency. When executed by the processor responsive to an occurrence of a promotional currency counter creation event associated with a second, different type of promotional currency, the instructions cause the processor to define, in run-time and without necessitating any update to the configuration of the gaming establishment patron management system, a second, different promotional currency counter operable to track the second, different type of promotional currency.

In certain embodiments, the present disclosure relates to a method of operating a system. Responsive to an occurrence of a promotional currency counter creation event, the method includes determining, by a processor, a promotional currency counter parameter, and defining, by the processor, a promotional currency counter associated with the determined promotional currency counter parameter. Responsive to an occurrence of a promotional currency counter modification event, the method includes modifying, by the processor, an integer value of gaming establishment promotional currency tracked by the defined promotional currency counter.

Additional features are described herein, and will be apparent from the following Detailed Description and the figures.

DETAILED DESCRIPTION

Figure 1:
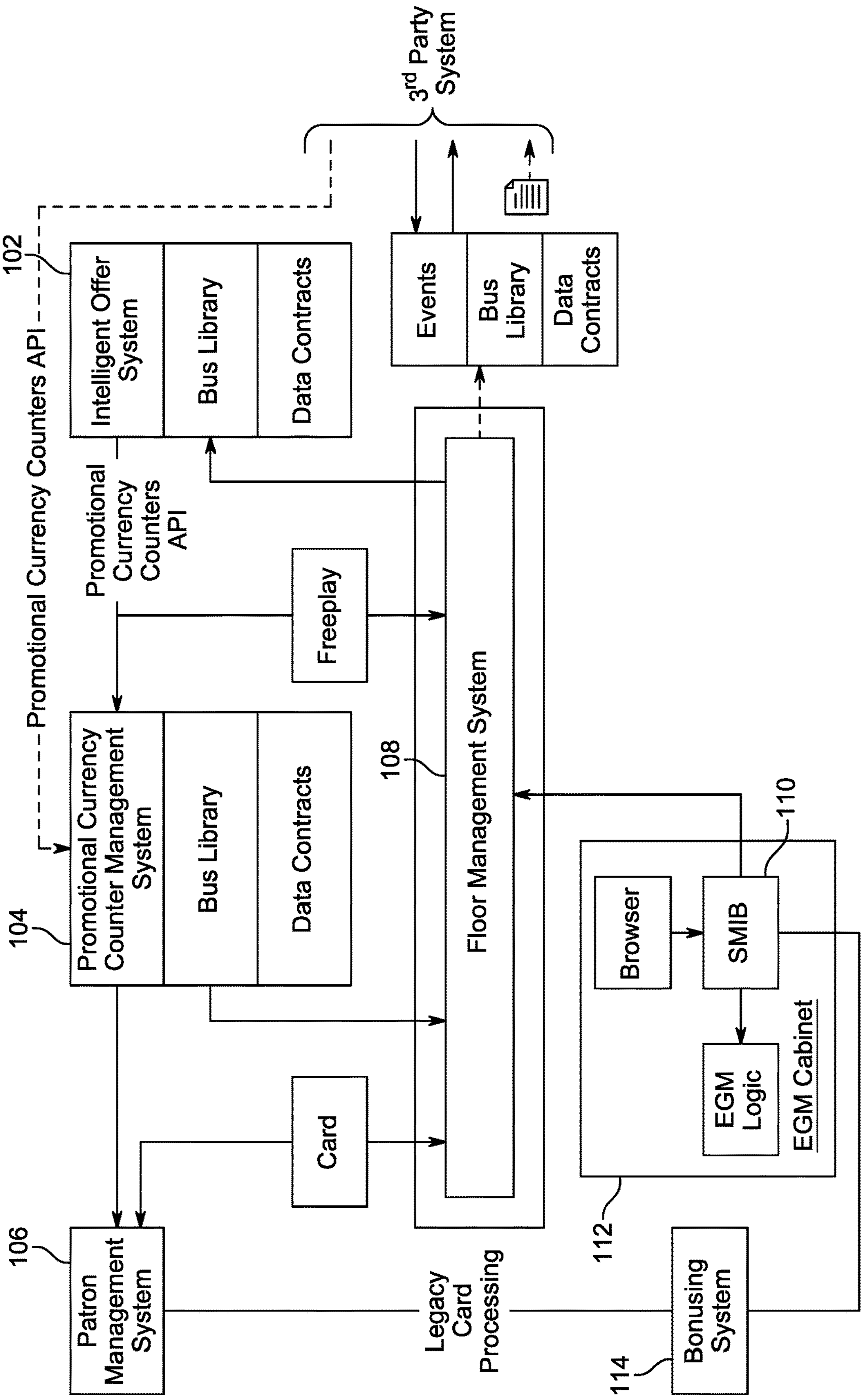
FIG. 1 is an example configuration of the architecture of a plurality of different components that are part of or operable with the system of the present disclosure.

In various embodiments, the systems and methods of the present disclosure enable the dynamic accumulation of values associated with various transactions occurring at a gaming establishment device.

In certain embodiments, to account for different activities associated with different transactions resulting in the accumulation of different promotional currencies, the systems and methods of the present disclosure enable the on-demand creation of a promotional currency counter or meter without any modifications to the underlying gaming establishment system, such as a gaming establishment patron management system, that maintains such a promotional currency. That is, in certain embodiments, the system enables a new promotional currency counter to be defined, at run-time, without any code change (and subsequent release) of any gaming establishment system and without any modification to any legacy promotional currency counter. For example, to track certain transactions occurring at an electronic gaming machine ("EGM"), the system enables the configuration of a new tracking bucket (i.e., a promotional currency counter that supports simultaneous, asynchronous credit and debit transactions) to account for such transactions.

In certain embodiments, following the creation of a promotional currency counter, the system enables transactions to be tracked via the promotional currency counter, such as by crediting and/or debiting values to the created counter over one or more sessions such that the created counter holds an integer value representative of these transactions. In addition to tracking an amount of promotional currency across one or more sessions, the created promotional currency counter provides a record of the different transactions associated with the counter to enable one or more of these transactions to be individually and/or collectively viewable by a user associated with such promotional currency and/or from a centralized location, such as a workstation of the underlying gaming establishment system.

In certain embodiments, in addition to defining one or more promotional currency counters or meters, the system enables the maintained value of promotional currency in one or more of such counters to be converted to a value of promotional currency maintained by another promotional currency counter or meter. In certain such embodiments, with or without the employment of a conversion rate between different promotional currencies, the system enables a user to cause one type of promotional currency maintained in one counter to be converted to another type of promotional currency maintained in another counter (without requiring any modifications to the underlying gaming establishment systems that maintains either promotional currencies).

Such a conversion via the employment of one or more defined promotional currency counters enables the redemption of certain promotional currencies in ways not previously available, thus offering more freedom of the use of promotional currencies within a gaming establishment ecosystem. That is, while prior systems may have maintained one or more types of promotional currencies, such promotional currencies were not freely convertible to each other and were limited in how such promotional currencies could be redeemed. As such, by introducing one or more dynamically defined promotional currency counters and utilizing such counters to convert different promotional currencies, the system and method of the present disclosure enables certain promotional currency that was previously non-redeemable at certain gaming establishment device to be converted to a different type of promotional currency redeemable at such gaming establishment devices. For example, following the accumulation of a quantity of non-monetary points in association with a defined non-monetary point counter (i.e., a promotional currency counter), the system enables such non-monetary points (which otherwise are not redeemable for any free plays of any games at an EGM) to be converted to a balance of points redeemable for free play of one or more games at an EGM.

Accordingly, the system of the present disclosure accounts for the different parameters associated with different promotional currencies and enables the use of defined counters to convert different promotional currencies having different parameters to each other to offer benefits to one or more users. Put differently, based on one or more parameters associated with a promotional currency, the system employs one or more defined counters and zero, one or more conversion rates to convert such a promotional currency to another promotional currency associated with one or more different parameters. Such a system thus enables processes to be applied to different promotional currencies to track progress of promotions involving such promotional currencies and adoption of such promotions. Such a configuration of enabling a user to convert promotional currencies amongst each other (via the employment of defined counters) fosters a more seamless experience for the users (whom such promotional currencies pertains to) in the face of certain regulatory restrictions on use and changing customer requirements.

While certain embodiments described below are directed to accumulating promotional currency in association with a defined promotional currency counter, redeeming promotional currency in association with a defined promotional currency counter and/or converting one promotional currency associated with one defined promotional currency counter for another promotional currency associated with another defined promotional currency counter in association with an EGM (such as, but not limited to, a slot machine, a video poker machine, a video lottery terminal, a terminal associated with an electronic table game, a terminal associated with a live table game, a video keno machine, a video bingo machine and/or a sports betting terminal that offers sports betting opportunities), it should be appreciated that such embodiments may additionally or alternatively be employed in association with accumulating promotional currency in association with a defined promotional currency counter, redeeming promotional currency in association with a defined promotional currency counter and/or converting one promotional currency associated with one defined promotional currency counter for another promotional currency associated with another defined promotional currency counter in association with any suitable component of a gaming establishment management system, such as a component of a patron management system, such as a slot machine interface board ("SMIB"), which is in communication with an EGM, any suitable personal gaming device (e.g., a mobile device executing a mobile device application that accesses data associated with the game over a network) and/or any suitable combination of a server operating with such a personal gaming device, with such an EGM, and/or with such a SMIB associated with an EGM.

In various embodiments, the present disclosure is directed to one or more systems, individual components (e.g., servers) and/or application programming interfaces that operate individually or collectively to enable the dynamic creation of one or more promotional currency counters or meters, the accumulation of promotional currency in association with a promotional currency counter, the redemption of promotional currency in association with a promotional currency counter and/or a conversion of one promotional currency associated with one promotional currency counter to another promotional currency associated with another promotional currency counter. For example, as seen in FIG. 1, the system includes or is otherwise in communication with a promotional offer system (e.g., intelligent offer system 102) that enables an operator to employ different variables, such as one or more play parameters and card-in events, to create and send promotions to qualified individuals (e.g., offering zero, one or more types of promotional currency) and implement a rules-engine to process real-time events and messages. The system includes or is otherwise in communication with a promotional currency counter system (e.g., promotional currency counter management system 104) that operates with the promotional offer system and enables the creation, modification and/or deletion of one or more promotional currency counters or meters.

As also seen in FIG. 1, the promotional currency counter system integrates or otherwise operates with a gaming establishment patron management system (e.g., patron management system 106) that monitors activities at various points of contact associated with the gaming establishment, stores patron records and data, such as transaction history, associated with one or more promotional currency counters. In these embodiments, the gaming establishment patron management system, such as a player tracking system, enables operators to recognize the value of customer loyalty by identifying frequent customers and rewarding them for their patronage. Specifically, such a gaming establishment patron management system is configured to track a user's gaming activity, such as, but not limited to, tracking any amounts wagered, average wager amounts, and/or the time at which these wagers are placed. In one such embodiment, the gaming establishment patron management system tracks users through the use of player tracking cards. In this embodiment, a user, such as a player, is issued an identification card that has an encoded user identification number that uniquely identifies the user. When the user's playing tracking card is inserted into a card reader of a gaming device, such as an EGM, to begin a gaming session, the card reader reads the user identification number off the player tracking card to identify the user. The gaming establishment patron management system timely tracks any suitable information or data relating to the identified user's gaming session. The gaming establishment patron management system also timely tracks when the player tracking card is removed to conclude play for that gaming session. In another embodiment, rather than requiring insertion of a player tracking card into the card reader, the gaming establishment patron management system utilizes one or more portable devices, such as a mobile phone, a radio frequency identification tag, or any other suitable wireless device, to track when a gaming session begins and ends. In another embodiment, the gaming establishment patron management system utilizes any suitable biometric technology or ticket technology to track when a gaming session begins and ends. In different embodiments, for one or more user, the gaming establishment patron management system stores the user's account number, the user's card number, the user's first name, the user's surname, the user's preferred name, the user's player tracking ranking, any promotion status associated with the user's player tracking card, the user's address, the user's birthday, the user's anniversary, the user's recent gaming sessions, or any other suitable data.

As additionally seen in FIG. 1, in this example, the system includes or is otherwise in communication with a gaming establishment device management system (e.g., floor management system 108) that interfaces with a component of the gaming establishment patron management system, such as SMIB 110 associated with EGM 112 to monitor activities of identified users (e.g., carded-in players) at various gaming establishment devices associated with a gaming establishment. In this example, SMIB 110 is also in communication with a gaming establishment bonusing system (e.g., bonusing system 114) that operates with the gaming establishment patron management system to offer one or more system bonuses at the gaming establishment device, such as the EGM 112. As further seen in FIG. 1, one or more third-party systems that monitor events occurring in association with the system and operate to offer zero, one or more types of promotional currency tracked by one or more promotional currency counters. In different embodiments, the system utilizes a mobile device running a mobile device application, a kiosk, an interface of a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interface with different parts that operate, individually or collectively, to enable the dynamic creation of one or more promotional currency counters or meters, the accumulation of promotional currency in association with a promotional currency counter, the redemption of promotional currency in association with a promotional currency counter and/or a conversion of one promotional currency associated with one promotional currency counter to another promotional currency associated with another promotional currency counter.

In operation of certain embodiments, upon a promotional currency counter creation event, the system defines a promotional currency counter. In these embodiments, the defined promotional currency counter is associated with one or more parameters such as a set of rules applied to certain counters or meters with respect to the creation, handling and access of certain data, such as promotional currency data. For example, upon a promotional currency counter creation event, such as responsive to one or more inputs by an operator of the system to establish a meter that tracks transactions associated with gift points made available to a user, the system establishes a promotional currency counter associated with tracking transactions associated with gift points.

In certain embodiments, a promotional currency counter creation event occurs based on one or more displayed events occurring in association with one or more plays of one or more games. In certain embodiments, a promotional currency counter creation event occurs based on an individual achieving a certain outcome. In certain other embodiments, a promotional currency counter creation event occurs based on an individual winning a certain amount of promotional currency from a play of a single game or winning a certain amount of promotional currency over a period of time. In certain other embodiments, a promotional currency counter creation event occurs based on an individual maintaining an active gaming session for a certain amount of time and/or over a certain quantity of games played. In certain embodiments, a promotional currency counter creation event occurs independent of any displayed events associated with any plays of any games.

In certain embodiments, one or more actions (or inactions) undertaken by a user, such as gaming establishment personnel and/or a player at an EGM, at least partially determines whether a promotional currency counter creation event occurs. In one such embodiment, a promotional currency counter creation event occurs based on a user making one or more inputs requesting the creation of one or more promotional currency counters. In this embodiment, upon receiving the request, the system determines whether to accept the request (and cause a promotional currency counter creation event to occur) or reject the request without any occurrence of a promotional currency counter creation event.

In certain embodiments, the system enables any individual to request an occurrence of a promotional currency counter creation event. In another embodiment, a promotional currency counter creation event occurs based on an individual purchasing an occurrence of the event using one or more of an amount of funds, an amount of virtual currency and/or an amount of player tracking points. In one such embodiment, a promotional currency counter creation event occurs based on an individual purchasing such an event for a static fee (in the form of an amount of funds, an amount of virtual currency and/or an amount of player tracking points). In another such embodiment, a promotional currency counter creation event occurs based on an individual purchasing such an event for a dynamic fee (in the form of an amount of funds, an amount of virtual currency and/or an amount of player tracking points).

In certain embodiments, different individuals have different requirements to cause a promotional currency counter creation event to occur. In certain embodiments, an individual's status or gaming establishment personnel rank (as determined by a gaming establishment patron management system, such as a player tracking system) at least partially determines one or more requirements to cause a promotional currency counter creation event to occur. In these embodiments, different individuals of different statuses or ranks are associated with different requirements to cause a promotional currency counter creation event to occur. In certain embodiments, a player's wagering history at least partially determines whether or not that player is eligible to cause a promotional currency counter creation event to occur. In certain embodiments, which EGM the player is currently conducting a gaming session at at least partially determines whether or not that player is eligible to cause a promotional currency counter creation event to occur. In certain other embodiments, an individual's non-wagering history, such as an individual's historical non-wagering purchases, an individual's historical activity (e.g., checking into a hotel and/or attending a show) and/or an individual's historical location data (as determined via a mobile device of the individual and/or a gaming establishment patron management system, such as a player tracking system) at least partially determines whether or not that individual is eligible to cause a promotional currency counter creation event to occur. In certain embodiments, the system enables qualifying individuals to request an occurrence of a promotional currency counter creation event and prevents non-qualifying individuals from making such requestions.

In another embodiment, a promotional currency counter creation event occurs or is otherwise enabled based on a current state of a gaming establishment. For example, upon the system determining that gaming activity at a gaming establishment is currently lower than expected, the system enables the occurrence of one or more promotional currency counter creation events for a set amount of time or until the system determines that the level of gaming activity at the gaming establishment is more in line with expectations.

In another embodiment, a promotional currency counter creation event occurs as part of a gaming establishment promotion. In certain such embodiments, one or more actions (or inactions) undertaken by the system (or an operator of the system) determines whether a promotional currency counter creation event occurs. In one such embodiment, a promotional currency counter creation event occurs based on an operator of the system making one or more inputs requesting such an event.

In certain embodiments, following the occurrence of the promotional currency counter creation event, the system defines the promotional currency counter by determining one or more parameters of such a promotional currency counter. In certain such embodiments, one or more parameters associated with the defined promotional currency counter pertain to the type of promotional currency being credited and/or debited in association with the defined counter. In different embodiments, the promotional currency available to be tracked includes, but is not limited to, gaming establishment rewards points, gaming establishment comp points, gaming establishment second comp points, gaming establishment gift points, local gaming establishment xtracredit points, global gaming establishment xtracredit points, gaming establishment player tracking points, linked gaming establishment comp points, linked gaming establishment second comp points, linked gaming establishment gift points and linked gaming establishment player tracking points.

It should be appreciated that certain of these promotional currencies, such as local gaming establishment xtracredit points and global gaming establishment xtracredit points, are redeemable or otherwise activatable for one or more plays of one or more games at an EGM, while others of these promotional currencies, such as gaming establishment rewards points, gaming establishment comp points, gaming establishment gift points and gaming establishment player tracking points are not redeemable or otherwise activatable for any plays of any games at any EGMs. As such, the type of promotional currency being tracked by such an on-demand counter determines whether that promotional currency may be redeemed for gameplay at an EGM or whether that promotional currency must be converted to another type of promotional currency and then redeemed for gameplay at an EGM.

In certain embodiments, one or more parameters associated with the defined promotional currency counter pertain to how such promotional currency is to be tracked. In one embodiment, the counter tracks accumulations of a defined promotional currency as points. In one embodiment, the counter additionally or alternatively tracks debits of a defined promotional currency as points. In one embodiment, the counter additionally or alternatively tracks adjustments of a defined promotional currency as points. In one embodiment, the counter additionally or alternatively tracks transfers of a defined promotional currency as points. In another embodiment, the counter tracks accumulations of a defined promotional currency as cents (or another monetary metric). In another embodiment, the counter additionally or alternatively tracks debits of a defined promotional currency as cents (or another monetary metric). In another embodiment, the counter additionally or alternatively tracks adjustments of a defined promotional currency as cents (or another monetary metric). In another embodiment, the counter additionally or alternatively tracks transfers of a defined promotional currency as cents (or another monetary metric).

In certain embodiments, one or more parameters associated with the defined promotional currency counter additionally or alternatively pertain to which systems may access and/or modify such a counter. For example, the system enables a gaming establishment patron management system, such as a player tracking system, to be associated with a defined promotional currency counter such that the gaming establishment patron management system (and/or an operator thereof) may modify the promotional currency of that counter.

In certain embodiments, one or more parameters associated with the defined promotional currency counter additionally or alternatively pertain to which entities may access such a counter. In certain embodiments, the system enables a user, such as a player, access to view each of the balances of the each of the defined promotional currency counters. In certain embodiments, the system enables a user, such as a player, access to view certain, but not all, of the balances of the defined promotional currency counters. In certain embodiments, as described above with relation to eligibility to be associated with an occurrence of a promotional currency counter creation event, the system enables different users having different statuses (e.g., different player tracking statuses) and/or different qualifications (e.g., wagering histories) different access to one or more promotional currency counters.

In certain embodiments, one or more parameters associated with the defined promotional currency counter additionally or alternatively pertain to how to access such a counter. For example, the system employs an externally controlled interface (e.g., a service window) displayed by an EGM to enable a user at the EGM to request a creation of a promotional currency counter, view a balance of promotional currency of the counter and/or request a modification of the counter, such as by requesting a conversion of one type of promotional currency tracked by that counter to another type of promotional currency tracked by another counter. In another example, the system enables a gaming establishment operator to access a promotional currency counter from an operator workstation to view transactions associated with that counter and a current balance of the counter.

In certain embodiments, one or more parameters associated with the defined promotional currency counter additionally or alternatively pertain to any limits on the credits to that counter over a predetermined period of time. For example, a parameter of a promotional currency counter that tracks comp points includes a maximum daily limit on comp points that may be accumulated in association with that counter. In certain embodiments, one or more parameters associated with the defined promotional currency counter additionally or alternatively pertain to any limits on the debits from that counter over a predetermined period of time. For example, a parameter of a promotional currency counter that tracks comp points includes a maximum daily limit on comp points that may be redeemed in association with that counter.

In certain embodiments, one or more parameters associated with the defined promotional currency counter additionally or alternatively pertain to one or more gaming establishments associated with the defined counter. In one such embodiment, a defined promotional currency counter is a local counter associated with a single gaming establishment. In this embodiment, the counter tracks activities involving a defined promotional currency in association with one gaming establishment. In another such embodiment, a defined promotional currency counter is a global counter associated with a plurality of gaming establishment. In this embodiment, the counter tracks activities involving a defined promotional currency in association with multiple gaming establishments. In certain such embodiments, a defined promotional currency counter is associated with a sharing configuration pertaining to which data may be accessed and/or modified by different entities as well as which data may not be accessed and/or modified by different entities. In these embodiments, the promotional currency counter parameter enables different data sets to be modifiable, shared, or not shared between different participating entities across different platforms in one or more jurisdictions such that certain aspects of a user's experience is fluid from one participating entity in one jurisdiction to another participating entity in another jurisdiction and that data sets particular to an individual user may or may not be preserved and/or modified between different entities in one or more jurisdictions.

In certain embodiments, one or more parameters associated with the defined promotional currency counter additionally or alternatively pertain to any expiration of the defined counter. In these embodiments, the parameter includes one or more of when a defined counter expires, what causes a defined counter to expire, and/or how to handle any accumulations by the counter when the expiration occurs (e.g., automatically forfeiting any unused units of promotional currency in a defined counter when an expiration occurs or transferring any unused units of promotional currency to another promotional currency counter). For example, a defined promotional currency counter is associated with a user's trip to a gaming establishment and a parameter of that counter provides that the counter is created at the beginning of the user's trip and the counter expires (and is correspondingly deleted) at the end of the user's trip.

In certain embodiments, one or more parameters associated with the defined promotional currency counter additionally or alternatively pertain to any expiration of the promotional currency accumulated in association with a defined counter. In these embodiments, the parameter includes one or more of when promotional currency accumulated in association with a defined counter expires, how such promotional currency expires (e.g., first-in, first-out or last-in, first out) and/or what causes the promotional currency accumulated in association with a defined counter to expire.

In certain embodiments, one or more parameters associated with the defined promotional currency counter pertain to how promotional credits are credited to the defined counter. In these embodiments, such parameters include the events that occur and/or the conditions satisfied to cause one or more types of promotional currency to be accumulated in association with a promotional currency counter. In certain embodiments, one or more types of promotional currency are accumulated in association with a defined promotional currency counter based on a displayed event, such as a displayed event associated with a play of a game and/or a sporting event. In certain embodiments, one or more types of promotional currency are accumulated in association with a defined promotional currency counter independent of any displayed event, such as independent of any play of a game and/or a sporting event.

In certain embodiments, one or more parameters associated with the defined promotional currency counter additionally or alternatively pertain to how promotional credits are debited from the defined counter. In these embodiments, such parameters include the events that occur and/or the conditions satisfied to cause one or more types of promotional currency to be removed from a promotional currency counter. In certain embodiments, one or more types of promotional currency are removed from a defined promotional currency counter based on a displayed event, such as a displayed event associated with a play of a game and/or a sporting event. In certain embodiments, one or more types of promotional currency are removed from a defined promotional currency counter independent of any displayed event, such as independent of any play of a game and/or a sporting event.

In certain embodiments, one or more parameters associated with the defined promotional currency counter pertain to any conversion rates associated with that defined counter. In certain embodiments, the system employs different conversation rates for promotional currency credited to a defined promotional currency counter and promotional currency debited from the defined promotional currency counter. In certain embodiments, the system employs the same conversation rate for promotional currency credited to a defined promotional currency counter and promotional currency debited from the defined promotional currency counter. In certain embodiments, the system utilizes different conversation rates associated with different defined promotional currency counters to convert different promotional currencies to each other. For example, converting gaming establishment rewards points to gaming establishment xtracredit points employs a first conversion rate while converting gaming establishment comp points to gaming establishment xtracredit points employs a second, different conversation rate. In certain embodiments, the system utilizes the same conversation rate associated with different defined promotional currency counters to convert different promotional currencies to each other. For example, converting gaming establishment rewards points to gaming establishment xtracredit points employs the same conversion rate as converting gaming establishment comp points to gaming establishment xtracredit points. In certain embodiments, the system does not employ any conversion rate in transferring promotional currency from one defined counter to another.

It should be appreciated that the dynamic definition of one or more promotional currency counters associated with one or more parameters occurs without any modifications to the underlying gaming establishment system, such as a gaming establishment patron management system, that maintains such a promotional currency. Put differently, the system enables a new promotional currency counter to be defined, at run-time, without any code change (and subsequent release) of any gaming establishment system. Such a configuration of one or more promotional currency counters that each supports simultaneous, asynchronous credit and debit transactions represents an improvement over existing systems that required updates (and associates downtime) to add or remove meters that track transactions.

Following the system dynamically defining a promotional currency counter and/or accessing a previously defined promotional currency counter, the system determines if a promotional currency counter modification event has occurred in association with that defined promotional currency counter. In these embodiments, since the promotional currency counter operates to hold an integer value, the system determines if any event has occurred which causes a modification of the integer value maintained by the defined promotional currency counter.

In certain embodiments, the promotional currency counter modification event includes a promotional currency accumulation event. In certain embodiments, a promotional currency accumulation event occurs in association with a play of a primary game and/or a play of a secondary game. For example, a promotional currency accumulation event occurs in association with a user, such as a player, reaching a designated level during a play of a game. In certain embodiments, a promotional currency accumulation event occurs independent of any displayed event associated with any plays of any of primary games and/or any plays of any secondary games. For example, a promotional currency accumulation event occurs in association with a user, such as a player, making one or more inputs associated with earning promotional currency.

In certain embodiments, a promotional currency accumulation event occurs in association with one or more events occurring at an EGM. For example, a promotional currency accumulation event occurs in association with a user, such as a player, taking one or more actions associated with obtaining a quantity of player tracking points at an EGM. In certain embodiments, a promotional currency accumulation event occurs independent of any events occurring at any EGMs. For example, a promotional currency accumulation event occurs in association with an event occurring during a play of a game displayed by a personal gaming device, such as a mobile device.

In certain embodiments, the promotional currency counter modification event includes a promotional currency redemption event. In certain embodiments, a promotional currency redemption event occurs in association with accessing a play of a primary game and/or a play of a secondary game. For example, a promotional currency redemption event occurs in association with a user, such as a player, making one or more inputs to redeem a quantity of a promotional currency to play a game. In certain embodiments, a promotional currency redemption event occurs independent of any displayed event associated with any plays of any of primary games and/or any plays of any secondary games. For example, a promotional currency redemption event occurs in association with a user, such as a player, making one or more inputs to redeem a quantity of a promotional currency to access a gaming establishment service, such as obtain tickets to an event being held at the gaming establishment or reserve an EGM for future play.

In certain embodiments, a promotional currency redemption event occurs in association with one or more events occurring at an EGM. For example, a promotional currency redemption event occurs in association with a user, such as a player, making one or more inputs associated with redeeming a quantity of player tracking points at an EGM to obtain a benefit, such as a game play benefit, at the EGM. In certain embodiments, a promotional currency redemption event occurs independent of any events occurring at any EGMs. For example, a promotional currency redemption event occurs in association with an offer accessed by a mobile device.

Figure 2A:
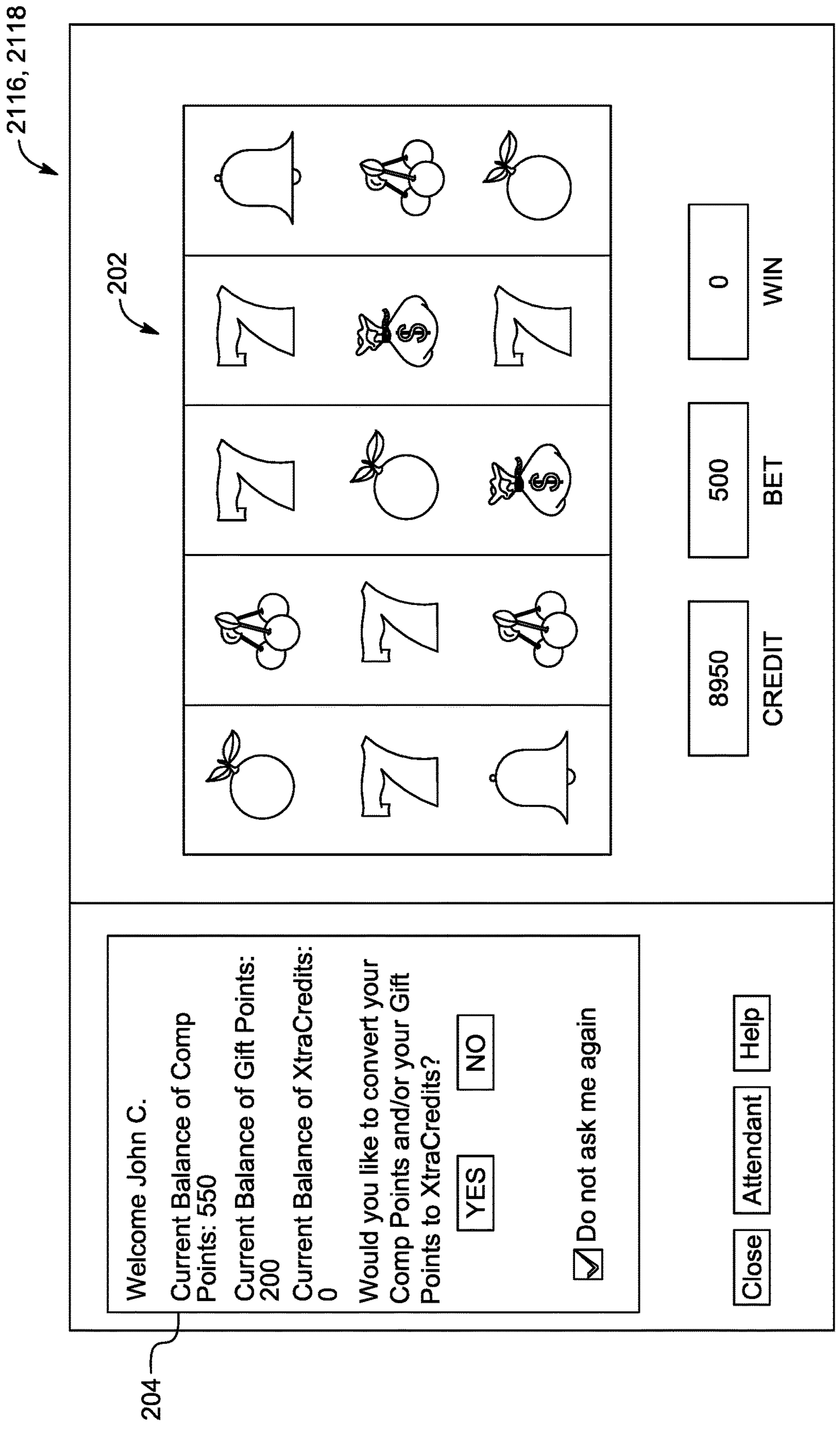
FIGS. 2A, 2B and 2C are example graphical user interfaces displayed by a gaming establishment device in connection with the earning, conversion and redemption of promotional currencies in association with the system of the present disclosure.

In certain embodiments, the promotional currency counter modification event includes a promotional currency conversion event. In certain embodiments, a promotional currency conversion event occurs in association with a user making one or more inputs to convert one type of promotional currency maintained by one defined promotional currency counter to another type of promotional currency maintained by another promotional currency counter. For example, as seen in FIG. 2A, in addition to an EGM displaying an available game 202, the EGM displays, in a service window 204, different quantities of different promotional currencies accumulated by different defined promotional currency counters and enables the user to cause a promotional currency conversion event to occur by making one or more inputs via the displayed service window of the EGM requesting a conversation of a quantity of comp points and/or gift points (i.e., promotional currencies not redeemable for gameplay at an EGM) to a quantity of xtracredits (i.e., a promotional currency redeemable for gameplay at the EGM).

In certain embodiments, a promotional currency conversion event occurs independent of any inputs made to cause such a conversion. For example, a promotional currency conversion event occurs in association with the system automatically converting a quantity of a promotional currency not redeemable for gameplay at an EGM to a quantity of a promotional currency redeemable for gameplay at the EGM.

In certain embodiments, a promotional currency conversion event occurs in association with one or more events occurring at an EGM. For example, upon the system determining that a credit balance at an EGM has fallen below a threshold balance, such as a balance needed to place a minimum wager, to enable potential additional gameplay at the EGM, the system enables a conversion of a quantity of a promotional currency not redeemable for gameplay at an EGM to a quantity of a promotional currency redeemable for gameplay at the EGM. In certain embodiments, a promotional currency conversion event occurs independent of any events occurring at any EGMs. For example, in planning an upcoming trip to a gaming establishment, a user accesses one or more defined promotional currency counters via a mobile device and requests a conversion of a quantity of one type of promotional currency to a quantity of another type of promotional currency.

Following an occurrence of a promotional currency counter modification event in association with a defined promotional currency counter, the system modifies the defined promotional currency counter to account for the modification event. In these embodiments, responsive to an event associated with modifying one or more values associated with one or more defined promotional currency counters, the system proceeds to update such values.

In certain embodiments in which the promotional currency counter modification event is a promotional currency accumulation event, the modification includes crediting a defined promotional currency counter with a quantity of promotional currency. For example, following a user, such as a player, reaching a designated level during a play of a game (i.e., an occurrence of a promotional currency accumulation event), the system credits a defined promotional currency counter with a quantity of promotional currency associated with such an event.

In certain embodiments in which the promotional currency counter modification event is a promotional currency redemption event, the modification includes debiting a defined promotional currency counter with a quantity of promotional currency. For example, following a user, such as a player, making one or more inputs to redeem a quantity of a promotional currency to play a game (i.e., an occurrence of a promotional currency redemption event), the system debits a defined promotional currency counter by a quantity of promotional currency to enable the play of the game.

In certain embodiments in which the promotional currency counter modification event is a promotional currency conversion event, the modification includes crediting one defined promotional currency counter with a quantity of promotional currency and debiting another defined promotional currency counter with a quantity of promotional currency. For example, following a user, such as a player, making one or more inputs to convert a quantity of a promotional currency not redeemable for gameplay at an EGM to a quantity of a promotional currency redeemable for gameplay at the EGM (i.e., an occurrence of a promotional currency conversion event), the system credits one defined promotional currency counter with a quantity of promotional currency associated with the conversion and also debits another defined promotional currency counter by a quantity of promotional currency associated with the conversion.

Figure 2B:
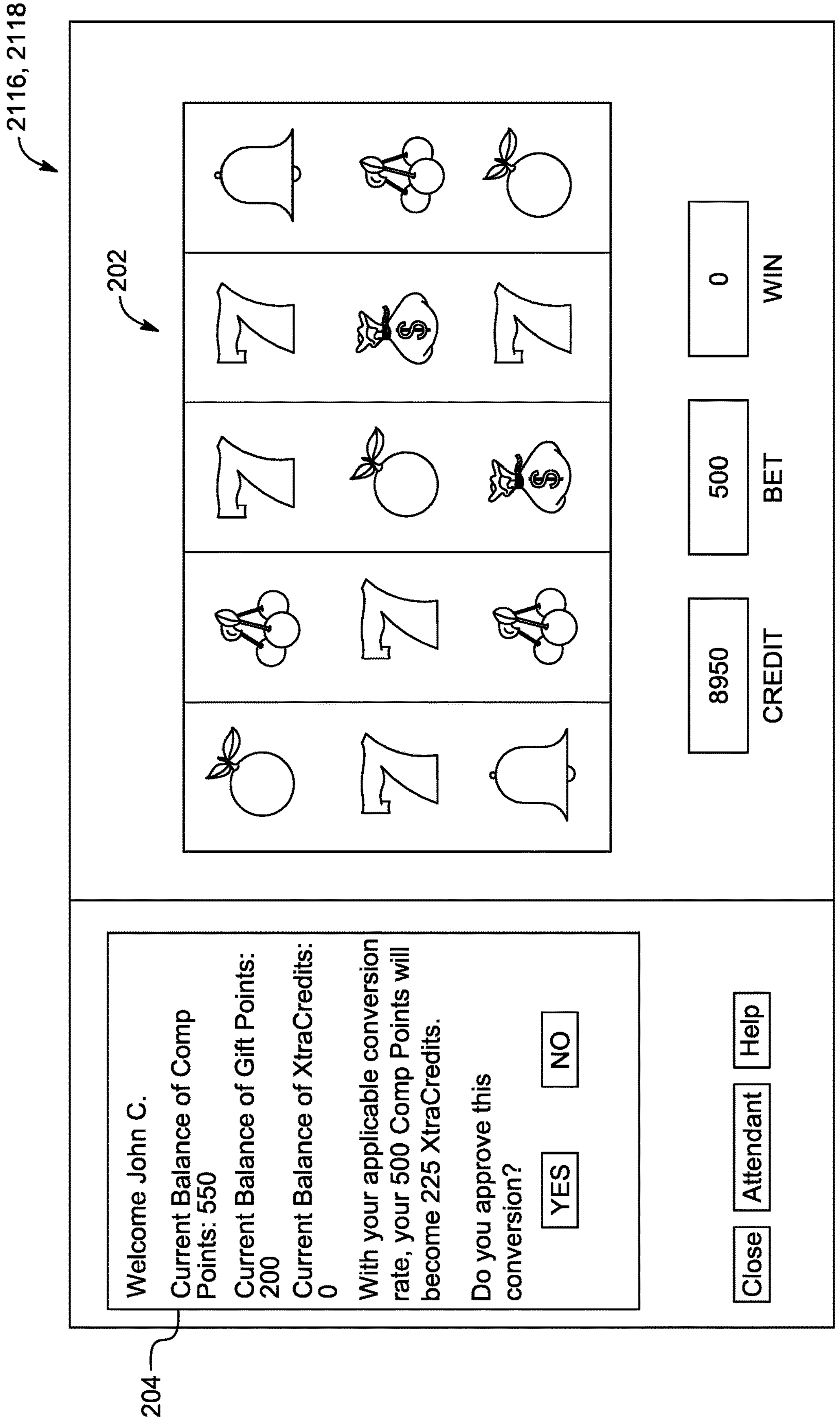

In certain embodiments, as explained above, zero, one or more conversion rates are employed in the conversion of one promotional currency to another promotional currency. In these embodiments, upon a promotional currency conversion event, the system determines if any conversion rates are applicable and if so, utilizes the applicable conversion rate to debit one promotional currency counter and credit another promotional currency counter. For example, as seen in FIG. 2B, since promotional currency redeemable or otherwise activatable for gameplay at an EGM (e.g., xtracredits) may be deemed relatively more valuable than promotional currency not redeemable or otherwise activatable for gameplay at an EGM (e.g., comp points), the system employs a conversion rate of 2:1 such that two units of the promotional currency not redeemable for gameplay at an EGM may be converted to one unit of the promotional currency redeemable for gameplay at an EGM.

Figure 2C:
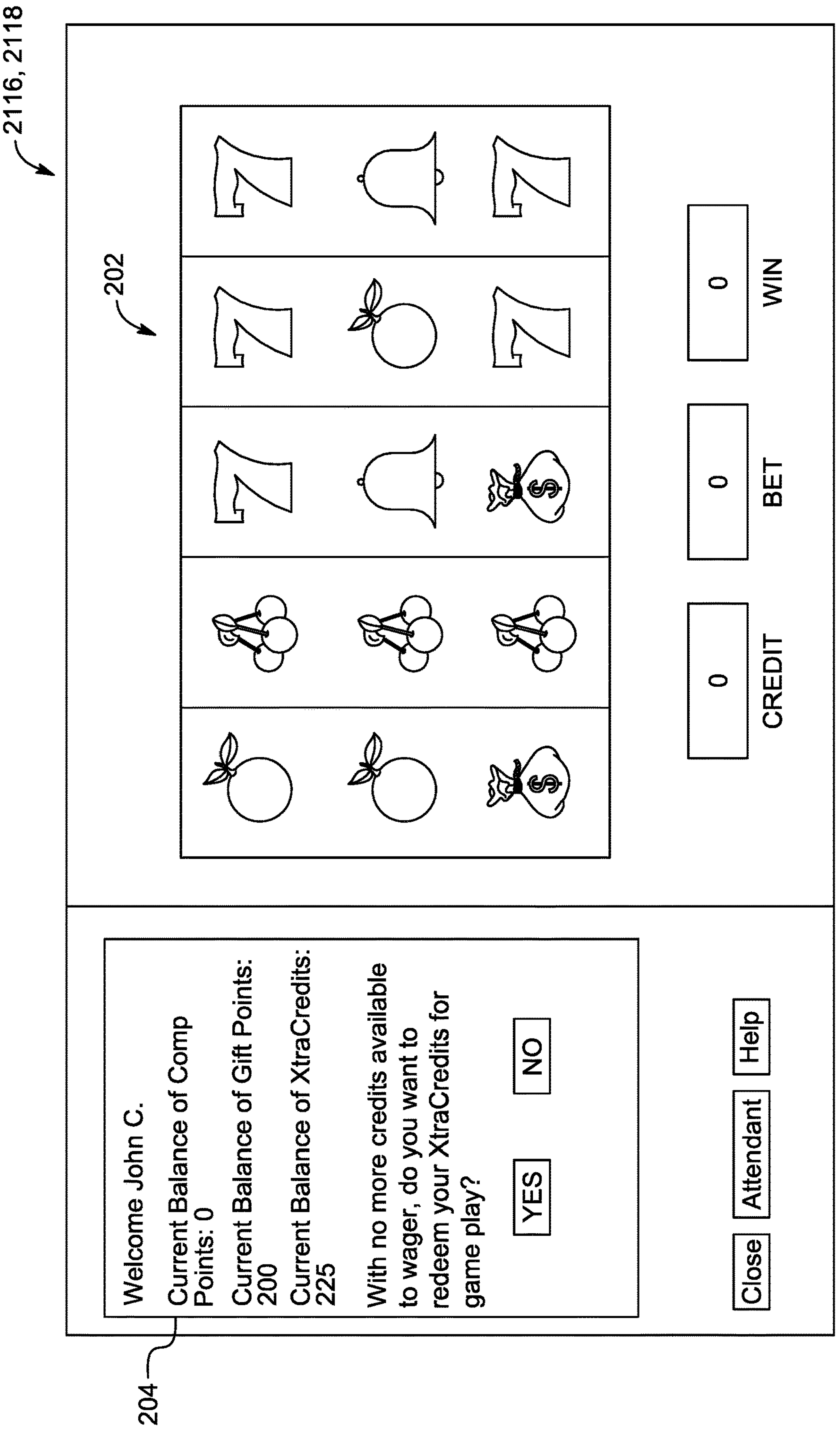

It should be appreciated that the conversion, via the employment of one or more defined promotional currency counters, enables the redemption of certain promotional currencies in ways not previously available, thus offering more freedom of the use of promotional currencies of a gaming establishment ecosystem. Specifically, while prior systems may have maintained one or more types of promotional currencies, such promotional currencies were not freely convertible to each other and were limited in how such promotional currencies could be redeemed. As such, by introducing one or more dynamically defined promotional currency counters and utilizing such counters to convert different promotional currencies, the system enables certain promotional currency that was previously non-redeemable at certain gaming establishment devices to be converted to a different type of promotional currency redeemable at such gaming establishment devices. For example, as seen in FIG. 2C, since the system previously enabled the user to convert one type of promotional currency not redeemable for gameplay at the EGM to another type of promotional currency redeemable for gameplay at the EGM, following the depletion of the credit balance of the EGM, the system enables the user to redeem part or all of their balance this converted to promotional currency (e.g., xtracredits) for additional gameplay in a way not available by prior systems.

Following any modification of the integer value of promotional currency held by one or more defined promotional currency counters, the system stores the values of any promotional currency currently held by such counters. In certain embodiments, the system stores data associated with the promotional currency maintained by a defined promotional currency counter using one or more components of the gaming establishment patron management system, such as one or more servers of a player tracking system. In certain embodiments, the system additionally or alternatively stores data associated with the promotional currency maintained by a defined promotional currency counter using one or more gaming establishment devices, such as one or more EGMs. In certain embodiments, the system additionally or alternatively stores data associated with the promotional currency maintained by a defined promotional currency counter using one or more components independent of any gaming establishment management system, such as a server maintained by a third-party separate from the user and the gaming establishment.

In certain embodiments, in addition to enabling one or more defined promotional currency counters to transact against one or more promotional currencies, the system operates to generate one or more reports regarding such transactions occurring in association with one or more defined promotional currency counters over a designated period of time. Such reports enable an operator to determine the effective of one or more promotions as well as enable one or more audits of transactions involving such promotional currency. It should be appreciated that in these embodiments, the reporting occurs without any modifications to the underlying gaming establishment system, such as a gaming establishment patron management system, that maintains such promotional currencies. That is, in addition to enabling a new promotional currency counter to be defined, at run-time, without any code change (and subsequent release) of any gaming establishment system, the system enables the reporting of transactions associated with such a promotional currency counter without any code change (and subsequent release) of any gaming establishment system.

Accordingly, the system of the present disclosure accounts for the different parameters associated with different promotional currencies and enables the use of defined counters to convert different promotional currencies having different parameters to each other to offer benefits to one or more users. Put differently, based on one or more parameters associated with a promotional currency, the system employs one or more defined counters and zero, one or more conversion rates to convert such a promotional currency to another promotional currency associated with one or more different parameters. Such a system thus enables processes to be applied to different promotional currencies to track progress of promotions involving such promotional currencies and adoption of such promotions. Such a configuration of enabling a user to convert promotional currencies amongst each other (via the employment of defined counters) fosters a more seamless experience for the users (whom such promotional currencies pertains to) in the face of certain regulatory restrictions on use and changing customer requirements.

It should be appreciated that any functionality or process of the present disclosure may be implemented via one or more servers (associated with or independent of any component of any system of the present disclosure), one or more application programming interfaces, one or more non-gaming establishment devices, a mobile device application, one or more gaming establishment devices (e.g., a gaming device such as an EGM or a non-gaming device such as a point-of-sale terminal of a retailer located within or otherwise associated with a gaming establishment), and/or one or more components of a gaming establishment system (such as a component of a gaming establishment device management system and/or a component of a gaming establishment patron management system).

In certain embodiments, the above-described embodiments of the present disclosure may be implemented in accordance with or in conjunction with zero, one or more components of a promotional offer system; zero, one or more components of a promotional currency counter system; zero, one or more components of a patron management system; zero, one or more components of a gaming establishment device management system and/or zero, one or more gaming establishment devices. In these embodiments, such components of the promotional offer system, the promotional currency counter system, the patron management system, the gaming establishment device management system and/or the gaming establishment device each include a controller including at least one processor.

The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the component of the promotional offer system, the component of the promotional currency counter system, the component of the patron management system, the component of the gaming establishment device management system and/or the gaming establishment device; (3) accessing memory to configure or reconfigure parameters in the memory according to indicia read from the component of the promotional offer system, the component of the promotional currency counter system, the component of the patron management system, the component of the gaming establishment device management system and/or the gaming establishment device; (4) communicating with interfaces and the peripheral devices (such as input/output devices); and/or (5) controlling the peripheral devices. In certain embodiments, one or more components of the controller (such as the at least one processor) reside within a housing of the component of the promotional offer system, the component of the promotional currency counter system, the component of the patron management system, the component of the gaming establishment device management system and/or the gaming establishment device, while in other embodiments, at least one component of the controller resides outside of the housing of the component of the promotional offer system, the component of the promotional currency counter system, the component of the patron management system, the component of the gaming establishment device management system and/or the gaming establishment device.

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMS, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the component of the promotional offer system, the component of the promotional currency counter system, the component of the patron management system, the component of the gaming establishment device management system and/or the gaming establishment device of the present disclosure. In certain embodiments, the at least one memory device resides within the housing of the component of the promotional offer system, the component of the promotional currency counter system, the component of the patron management system, the component of the gaming establishment device management system and/or the gaming establishment device, while in other embodiments at least one component of the at least one memory device resides outside of the housing of the component of the promotional offer system, the component of the promotional currency counter system, the component of the patron management system, the component of the gaming establishment device management system and/or the gaming establishment device. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the component of the promotional offer system, the component of the promotional currency counter system, the component of the patron management system, the component of the gaming establishment device management system and/or the gaming establishment device; (2) associations between configuration indicia read from the component of the promotional offer system, the component of the promotional currency counter system, the component of the patron management system, the component of the gaming establishment device management system and/or the gaming establishment device with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the component of the promotional offer system, the component of the promotional currency counter system, the component of the patron management system, the component of the gaming establishment device management system and/or the gaming establishment device to communicate with local and non-local devices using such protocols.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the component of the promotional offer system, the component of the promotional currency counter system, the component of the patron management system, the component of the gaming establishment device management system and/or the gaming establishment device to control the component of the promotional offer system, the component of the promotional currency counter system, the component of the patron management system, the component of the gaming establishment device management system and/or the gaming establishment device. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a non-operator patron uses such a removable memory device in association with one or more of the component of the promotional offer system, the component of the promotional currency counter system, the component of the patron management system, the component of the gaming establishment device management system and/or the gaming establishment device to implement at least part of the present disclosure. In other embodiments, part or all of the program code and/or the operating data is downloaded to the at least one memory device of the component of the promotional offer system, the component of the promotional currency counter system, the component of the patron management system, the component of the gaming establishment device management system and/or the gaming establishment device through any suitable data network described above (such as an Internet or intranet).

The at least one memory device also stores a plurality of device drivers. Examples of different types of device drivers include device drivers for the component of the promotional offer system, the component of the promotional currency counter system, the component of the patron management system, the component of the gaming establishment device management system and/or the gaming establishment device and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the component of the promotional offer system, the component of the promotional currency counter system, the component of the patron management system, the component of the gaming establishment device management system and/or the gaming establishment device. Non-limiting examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the component of the promotional offer system, the component of the promotional currency counter system, the component of the patron management system, the component of the gaming establishment device management system and/or the gaming establishment device loads the new device driver from the at least one memory device to enable communication with the new device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate specified components of the promotional offer system, the promotional currency counter system, the patron management system, the gaming establishment device management system and/or the gaming establishment device and/or information, such as hardware components, software components, firmware components, peripheral device components, user input device components, information received from one or more user input devices, information stored in the at least one memory device, etc.

In certain embodiments, the peripheral devices of or otherwise associated with the component of the promotional offer system, the component of the promotional currency counter system, the component of the patron management system, the component of the gaming establishment device management system and/or the gaming establishment device include several device interfaces, such as, but not limited to: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

Figure 3:
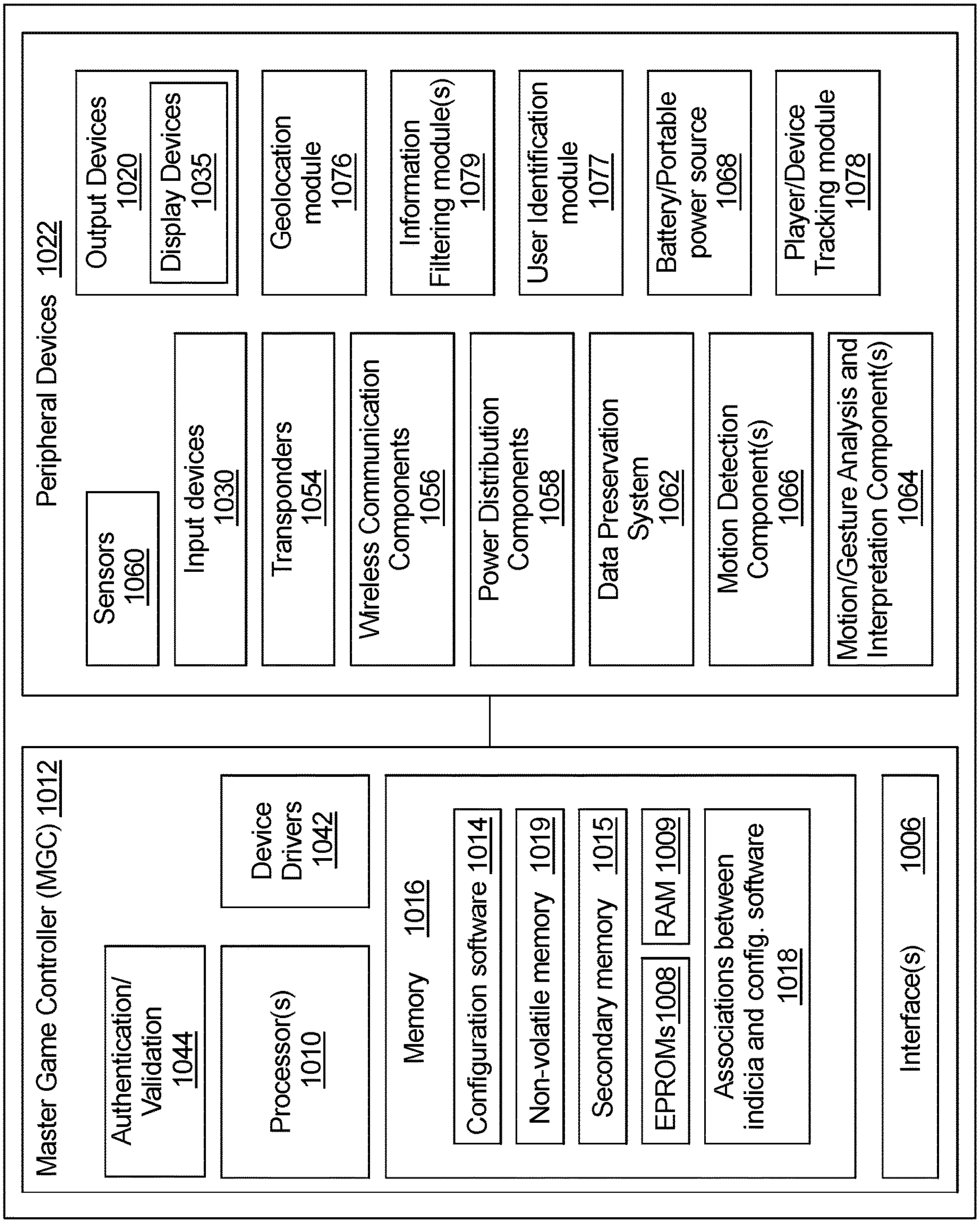
FIG. 3 is a schematic block diagram of one embodiment of an electronic configuration of an example gaming system of the present disclosure.
Figure 4A:
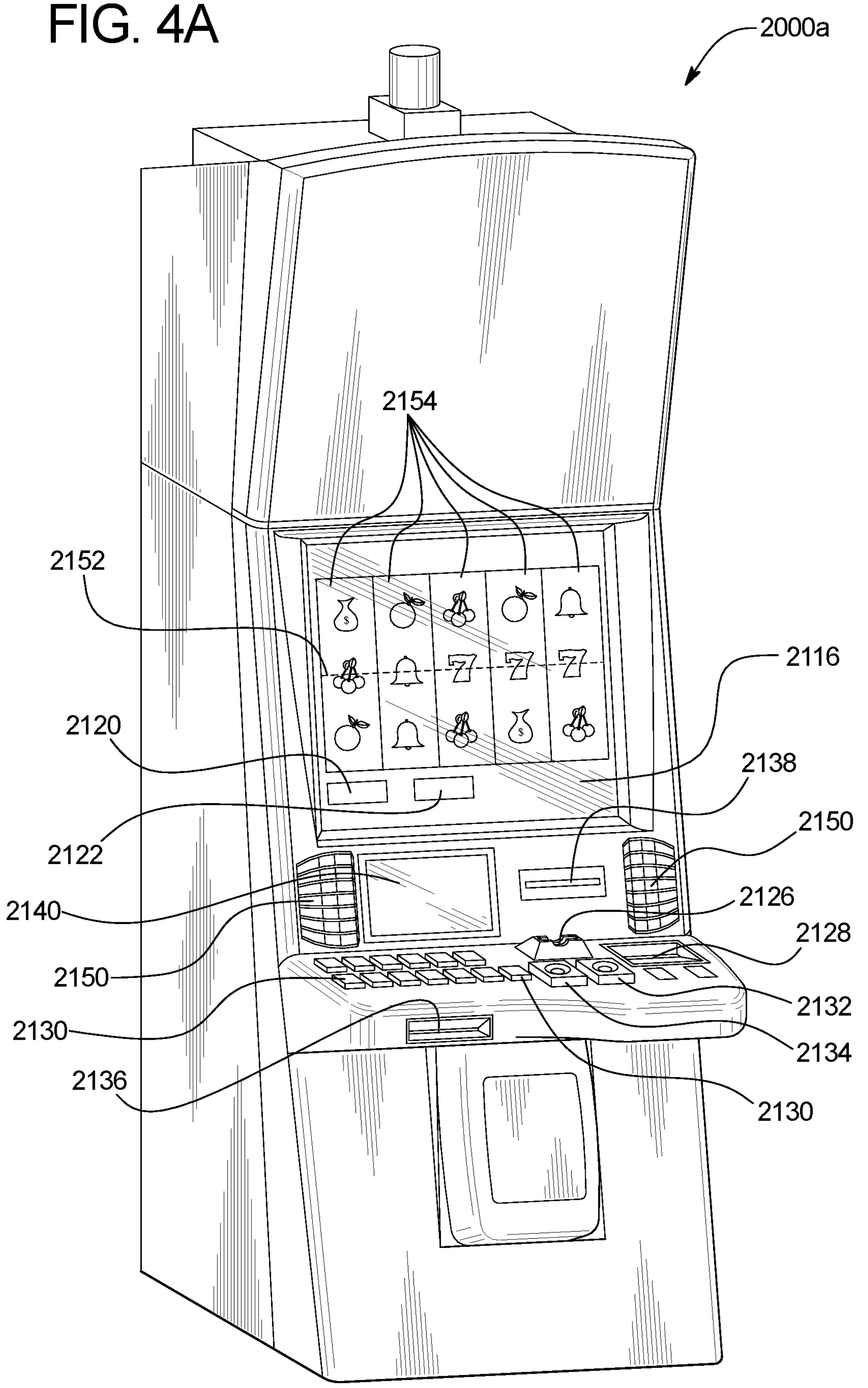
FIGS. 4A and 4B are perspective views of example alternative embodiments of an electronic gaming machine of the present disclosure.
Figure 4B:
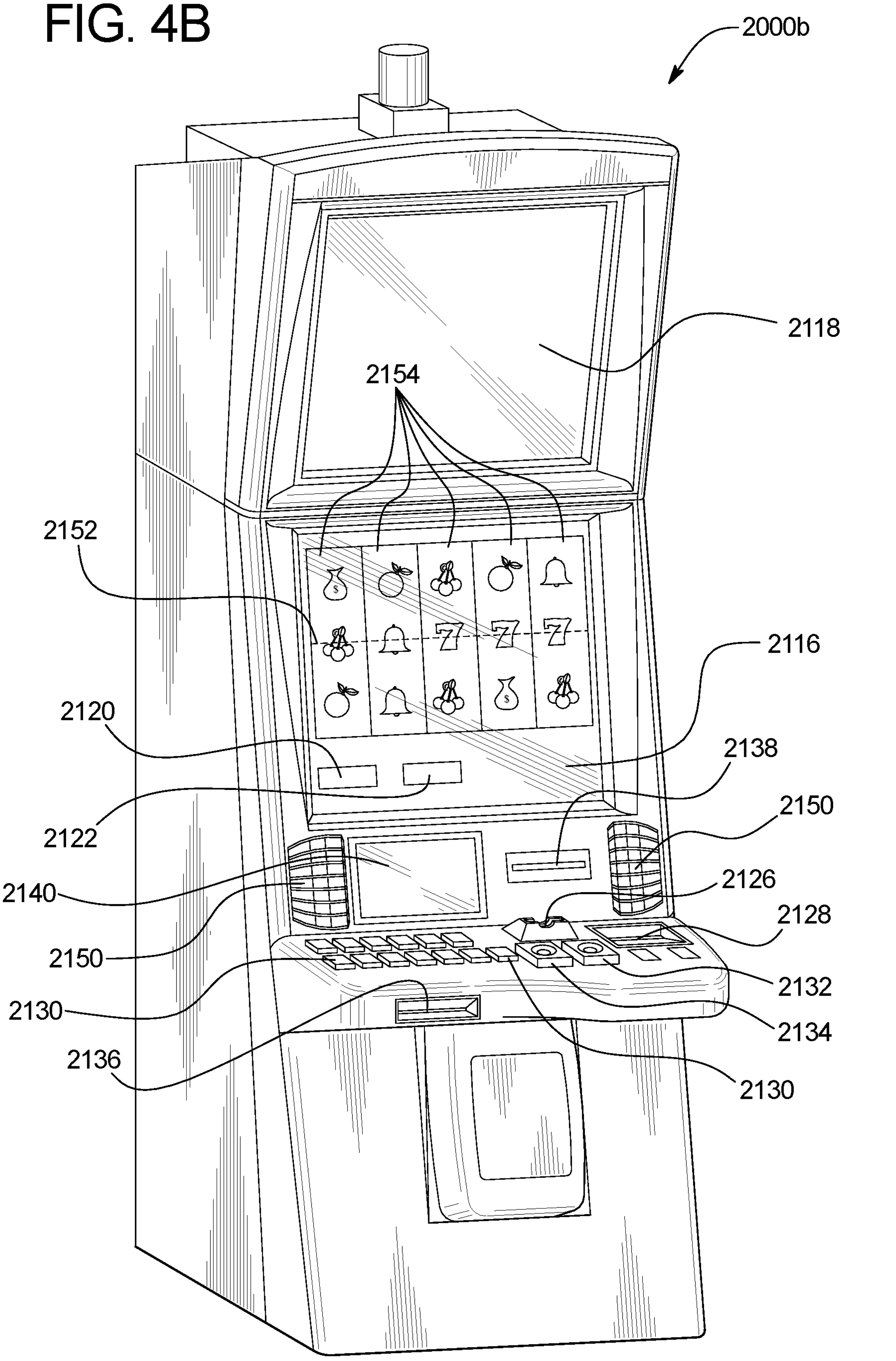
Figure 4C:
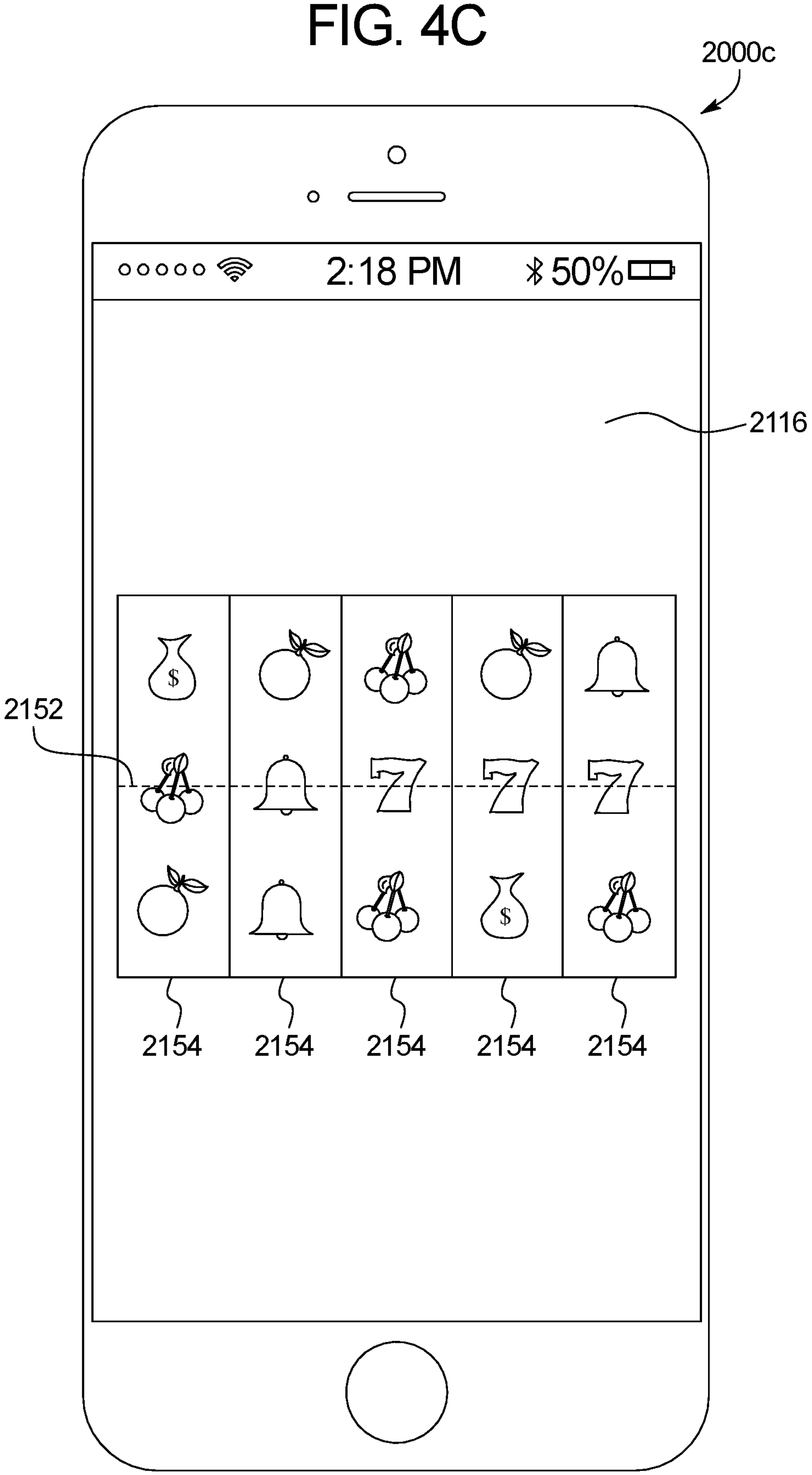
FIG. 4C is a front view of an example personal gaming device of the present disclosure.

More specifically, FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. It should be appreciated that while the below refers to EGMs, in various embodiments, a personal gaming device (such as personal gaming device 2000*c* of FIG. 4C), the component of the promotional offer system, the component of the promotional currency counter system, the component of the patron management system, the component of the gaming establishment device management system and/or a non-EGM gaming establishment device (e.g. a point-of-sale terminal of a retailer located within or otherwise associated with a gaming establishment) may include some or all of the below components.

In these embodiments, the EGM 1000 includes a master gaming controller 1012 configured to communicate with and to operate with a plurality of peripheral devices 1022. The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMS, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM **2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122**.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs **2000*a* and 2000*b* illustrated in FIGS. 4A and 4B each include a ticket printer and dispenser 2136**.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs **2000*a* and 2000*b* illustrated in FIGS. 4A and 4B each include a plurality of speakers 2150**. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all systems, and these example EGMs may not include one or more elements that are included in other systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the system includes a server and a changeable EGM (i.e., a thin client embodiment), the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both.

In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the system generates the game outcome(s) and/or the award(s) to be provided based on the associated probabilities. In these embodiments, since the system generates game outcomes and/or awards randomly or based on one or more probability calculations, there is no certainty that the system will ever provide any specific game outcome and/or award.

In certain embodiments, the system maintains one or more predetermined pools or sets of predetermined game outcomes and/or awards. In certain such embodiments, upon generation or receipt of a game outcome and/or award request, the system independently selects one of the predetermined game outcomes and/or awards from the one or more pools or sets. The system flags or marks the selected game outcome and/or award as used. Once a game outcome or an award is flagged as used, it is prevented from further selection from its respective pool or set; that is, the system does not select that game outcome or award upon another game outcome and/or award request. The system provides the selected game outcome and/or award.

In certain embodiments, the system determines a predetermined game outcome and/or award based on the results of a bingo, keno, or lottery game. In certain such embodiments, the system utilizes one or more bingo, keno, or lottery games to determine the predetermined game outcome and/or award provided for a primary game and/or a secondary game. The system is provided or associated with a bingo card. Each bingo card consists of a matrix or array of elements, wherein each element is designated with separate indicia. After a bingo card is provided, the system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the system includes a real-time or online accounting and gaming information system configured to communicate with the server. In this embodiment, the accounting and gaming information system includes: (a) a player database configured to store player profiles, (b) a player tracking module configured to track players (as described below), and (c) a credit system configured to provide automated transactions.

As noted above, in various embodiments, the system includes one or more executable game programs executable by at least one processor of the system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the system. In certain such embodiments, the system includes one or more paylines associated with the reels. The example EGM **2000*b* shown in FIG. 4B includes a payline 2152 and a plurality of reels 2154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The system enables a wager to be placed on one or more of such paylines to activate such paylines. In other embodiments in which one or more paylines are formed between at least two adjacent symbol display areas, the system enables a wager to be placed on a plurality of symbol display areas, which activates those symbol display areas.

In various embodiments, the system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the system includes a progressive award. Typically, a progressive award includes an initial amount and an additional amount funded through a portion of each wager placed to initiate a play of a primary game. When one or more triggering events occurs, the system provides at least a portion of the progressive award. After the system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the system automatically provides or initiates the secondary game upon the occurrence of a triggering event or the satisfaction of a qualifying condition. In other embodiments, the system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the system includes a geo-fence system that enables tethered game play within a particular geographic area but not outside of that geographic area.

In certain embodiments, the system is configured to communicate with a social network server that hosts or partially hosts a social networking website via a data network (such as the Internet) to integrate a player's gaming experience with the player's social networking account. This enables the system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the system to receive certain information from the social network server, such as the player's likes or dislikes or the player's list of connections. In certain embodiments, the system enables the player to link the player's player account to the player's social networking account(s). This enables the system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the system enables the player to recommend a game to the player's connections by posting a recommendation to the player's wall (or other suitable area) of the social networking website.

Certain of the systems described herein, such as EGMs located in a casino or another gaming establishment, include certain components and/or are configured to operate in certain manners that differentiate these systems from general purpose computing devices. For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a relatively simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to “re-trigger” the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player’s wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as “fault-tolerant” memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary, a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:
- a processor; and
- a memory device that stores a plurality of instructions that, when executed by the processor, cause the processor to:
  - responsive to an occurrence of a promotional currency counter creation event associated with an input received via an input device:
    - determine a promotional currency counter parameter, and
    - define a promotional currency counter associated with the determined promotional currency counter parameter, and
  - responsive to an occurrence of a promotional currency counter modification event, modify an integer value of gaming establishment promotional currency tracked by the defined promotional currency counter.

2. The system of claim 1, wherein the promotional currency counter parameter comprises a type of gaming establishment promotional currency tracked by the defined promotional currency counter.

3. The system of claim 1, wherein the promotional currency counter parameter comprises an access to view the integer value of gaming establishment promotional currency tracked by the defined promotional currency counter.

4. The system of claim 1, wherein the promotional currency counter parameter comprises an access to transact against the integer value of gaming establishment promotional currency tracked by the defined promotional currency counter.

5. The system of claim 1, wherein the promotional currency counter parameter comprises a limitation associated with transacting against the integer value of gaming establishment promotional currency tracked by the defined promotional currency counter.

6. The system of claim 1, wherein the promotional currency counter parameter is associated with an expiration of any gaming establishment promotional currency tracked by the defined promotional currency counter.

7. The system of claim 1, wherein the definition of the promotional currency counter associated with the determined promotional currency counter parameter occurs independent of any modification to any instructions stored by a memory device of a gaming establishment patron management system.

8. The system of claim 1, wherein the definition of the promotional currency counter associated with the determined promotional currency counter parameter occurs independent of any modification to the instructions stored by the memory device.

9. The system of claim 1, wherein the occurrence of the promotional currency counter modification event comprises one of a promotional currency accumulation event, a promotional currency redemption event, and a promotional currency conversion event.

10. A gaming establishment patron management system comprising:
- a processor; and
- a memory device that stores a plurality of instructions that, when executed by the processor, cause the processor to:
  - responsive to an occurrence of a promotional currency counter creation event associated with a first type of promotional currency and associated with a first input received via an input device, define, in run-time and without necessitating any update to a configuration of the gaming establishment patron management system, a first promotional currency counter operable to track the first type of promotional currency, and
  - responsive to an occurrence of a promotional currency counter creation event associated with a second, different type of promotional currency and associated with a second input received via the input device, define, in run-time and without necessitating any update to the configuration of the gaming establishment patron management system, a second, different promotional currency counter operable to track the second, different type of promotional currency.

11. The gaming establishment patron management system of claim 10, wherein the first type of promotional currency is redeemable for a play of a game at an electronic gaming machine and the second type of promotional currency is not redeemable for any play of any game at any electronic gaming machine.

12. A method of operating a system, the method comprising:
- responsive to an occurrence of a promotional currency counter creation event associated with an input received via an input device:
  - determining, by a processor, a promotional currency counter parameter, and
  - defining, by the processor, a promotional currency counter associated with the determined promotional currency counter parameter, and
- responsive to an occurrence of a promotional currency counter modification event, modifying, by the processor, an integer value of gaming establishment promotional currency tracked by the defined promotional currency counter.

13. The method of claim 12, wherein the promotional currency counter parameter comprises a type of gaming establishment promotional currency tracked by the defined promotional currency counter.

14. The method of claim 12, wherein the promotional currency counter parameter comprises an access to view the integer value of gaming establishment promotional currency tracked by the defined promotional currency counter.

15. The method of claim 12, wherein the promotional currency counter parameter comprises an access to transact against the integer value of gaming establishment promotional currency tracked by the defined promotional currency counter.

16. The method of claim 12, wherein the promotional currency counter parameter comprises a limitation associated with transacting against the integer value of gaming establishment promotional currency tracked by the defined promotional currency counter.

17. The method of claim 12, wherein the promotional currency counter parameter is associated with an expiration of any gaming establishment promotional currency tracked by the defined promotional currency counter.

18. The method of claim 12, wherein the definition of the promotional currency counter associated with the determined promotional currency counter parameter occurs independent of any modification to any instructions stored by a memory device of a gaming establishment patron management system.

19. The method of claim 12, wherein the definition of the promotional currency counter associated with the determined promotional currency counter parameter occurs independent of any modification to any instructions stored by a memory device of the system.

20. The method of claim 12, wherein the occurrence of the promotional currency counter modification event comprises one of a promotional currency accumulation event, a promotional currency redemption event, and a promotional currency conversion event.

* * * * *